2,776,228

PROCESS FOR DESTARCHING WET MILLING FRACTIONS

Edward C. Snyder, Bellwood, Ill., assignor to Corn Products Refining Company, New York, N. Y., a corporation of New Jersey No Drawing. Application July 23, 1952,
Serial No. 300,520

16 Claims. (Cl. 127—38)

This invention relates to the destarching of crude fiber obtained as a by-product in the wet milling of cereal grains, particularly corn and grain sorghum, and likewise to the destarching of other fiber-containing by-products, such as gluten, and to mixtures of such by-products.

It is an object of this invention to provide a process for the separation and recovery of amylaceous material from said fiber or fiber-containing by-products. It is a further object of this invention to prepare protein-containing carbohydrate syrups from such by-products. Another object is the preparation of such syrups particularly adapted for use as substrates for fermentation reactions. A still further object is to improve the value of said by-products by destarching the same and thus increasing their protein content.

In the wet milling of cereal grains, e. g. corn and grain sorghum, the grain is steeped in water containing sulfur dioxide to soften the same and then subjected to a series of separating operations for the removal of germ, bran or hull, and fiber from the starch and gluten. The starch and gluten are then further separated from each other.

The milling by-product commonly referred to in the industry as "fiber" contains the greatest portion of the fibrous materials of the grain, including bran or hull particles, along with some starch, protein and other materials, and the term "fiber," as used herein, is intended to have the same meaning.

The crude fiber obtained in the wet milling process may contain up to 40 percent starch and up to approximately 15 to 20 percent protein. The crude fiber is usually disposed of by incorporating it with other by-products of the milling process for sale as animal feed. In addition to constituting an economic loss due to the lower market value of feed compared to starch, this practice depreciates the value of the feed itself since feeds decrease in value as the protein content thereof decreases, and the substantial percentage of starch in the fiber lowers the concentration of protein in a given quantity of feed.

Corn gluten, another by-product of starch manufacture, contains approximately 40 to 70 percent protein, approximately 15 to 30 percent starch, and approximately 5 to 10 percent fiber.

Heretofore no satisfactory economical method for recovering the starch from by-products of starch manufacture, such as crude fiber, gluten, or mixtures of these, in usable form was known. Recovery of the starch as such, i. e. without solubilization thereof, is not particularly attractive economically in view of the fact that the starch available in such by-products is usually not of prime quality. Moreover, such by-products are as reduced in starch content as presently available mechanical operations permit. However, such residual starch, if recoverable, would be suitable for preparation of proteinaceous syrups, or protein-rich fermentation substrates.

For example, in the case of fiber, enzymatic solubilization of the starch, while quite specific under proper conditions, is uneconomical partly due to the fact that residual sulfur dioxide present in the fiber from the steeping process forms sulfurous acid, which inhibits enzyme action so that exhorbitant amounts of enzyme are required unless the crude fiber is washed exhaustively.

Solubilization of the starch with mineral acid in a manner similar to that normally used in the preparation of carbohydrate syrups solubilizes an objectionably large portion of the protein along with the starch, and yields products of unacceptable color. This not only results in an unsatisfactory extractive for most purposes but, also renders the fiber undesirable as a component of the feed by reason of its greatly lowered protein content.

I have discovered an economical process for destarching crude fiber and other starch-containing by-products obtained in the wet milling of cereal grains and recovering the starch therefrom without solubilizing a substantial amount of protein. The products of my process represent a direct source of inexpensive protein-containing syrups and of residue products of enhanced value because of their increased protein content.

The process of my invention comprises heating an aqueous slurry of crude fiber or other starch-containing by-product under pressure, as in an autoclave, within a limited pH range, and under controlled conditions such that substantially all of the starch is gelatinized and solubilized while gluten is ordinarily depressed in solubility. At this stage, before the temperature of the slurry has dropped substantially, the mixture can be filtered readily; the fiber itself may act as a filter aid in this operation and the gluten has lost much of its swelling characteristic. The value of the fiber as a component of feed is thus increased by effectively increasing the concentration of protein therein, and the aqueous phase or extract obtained in this process, after being separated from the fiber, furnishes a protein-containing carbohydrate syrup of value as a substrate in fermentation reactions. It may be further concentrated or hydrolyzed.

The critical variables in my process are the pH of the aqueous slurry employed during the heat treatment and the temperature at which the heated slurry is filtered.

I have found that at a pH within the range of about 3.2 to about 4.0 substantially all of the starch present in such wet milling fractions may be solubilized in the hot slurry but only a small percentage of the nitrogen content is simultaneously solubilized. Although a higher or lower pH may be used, values substantially above 4 result in a markedly slower rate of solubilization of the starch and in poor filterability, while pH values appreciably below 3.2 result in the solubilization of substantial amounts of protein.

As already indicated, the mixture containing the gelatinized, and probably slightly degraded, starch is readily filterable only while hot. Therefore, it is critical that the mixture be filtered immediately following the heat treatment, before the temperature is allowed to fall substantially below 100° C. As mentioned above, residual sulfur dioxide in the crude fiber produces sulfurous acid upon slurrying the same in water. I have found that the resultant pH value of the slurry will usually be within the aforesaid preferred range, ordinarily about 3.6, and hence in most cases no reagent need be added to the slurry to attain the preferred pH range.

Although the concentration of the slurry is not critical, it is advantageous to employ a slurry containing from about 5 to about 25 percent total solids or one that will yield filtrates containing from about 2 to about 5 percent starch. Other concentrations may be employed if desired. However, lower concentrations merely increase the amount of water which must be subsequently evaporated to produce the syrup, and higher concentrations necessitate additional washing of the treated fiber for efficient removal of the solubles, which likewise presents certain disadvantages.

Length of reaction time, and pressure of the heating are interrelated variables, i. e. the higher the pressure, the shorter the treating period required. It has been found that at a steam pressure of 15 p. s. i. a treating period of about 2 hours is sufficient to solubilize and extract substantially all of the starch present in crude fiber, although periods as short as 15 minutes are adequate depending upon the efficiency of heat transfer in the equipment employed. Higher or lower pressures may be used with correspondingly shorter or longer treating periods, but I have found that pressures of from 10 to 15 p. s. i. are entirely satisfactory. These conditions are not critical insofar as solubilization of the starch is concerned, but for optimum filterability the temperature of the treated slurry should be as high as practical at the time of filtration.

In destarching crude fiber-containing products of grain wet milling according to the process of my invention, although not essential, it is preferable to employ crude fiber or gluten which has been dewatered, e. g. by a plate and frame press, rather than the slurry obtained directly from wet milling operations. The latter contains a substantial amount of dissolved protein, and the removal of the liquid phase, therefore, yields syrups of lower protein content, which are more suitable for most anticipated uses of the carbohydrate syrups obtained. However, if a higher protein content is unobjectionable or perhaps desirable, such process slurries will be satisfactory.

My process is applicable for recovering starch from gluten, producing gluten products of enhanced protein, content, and for recovering starch from mixtures of crude fiber and gluten as well as for the recovery of starch from crude fiber.

The following examples, which are intended as typical and informative only and not in a limiting sense, will further illustrate the process of this invention:

EXAMPLE 1

One hundred and fifty grams of fine fiber press cake as obtained from the wet milling of corn (about 40 percent dry substance—40 percent starch and 14.2 percent protein, dry basis) was slurried in 600 ml. of water. The resulting slurry, which had a total solids concentration of about 10 percent and a pH value of 3.6, was autoclaved for 2 hours at 15 p. s. i. and filtered immediately through 17½ oz. twill on a Buchner funnel. The resulting filtrate had a D. E. value (dextrose equivalent or reducing value calculated as dextrose) of 6.6 percent (dry basis), and contained 44 percent of the original solids at a concentration of 5.0 grams per 100 ml. Of the dry substance solubilized, 4 percent (dry basis) was protein (N×6.25), representing 1.8 percent of the original solids or 12.6 percent of the original apparent protein content. The solubilized non-protein dry substance (essentially slightly degraded starch) thus represented 42.3 percent of the original solids.

The preceding example illustrates the preferred procedure for executing the process of this invention as applied to crude fiber. The following example illustrates the effect of pH on aqueous slurries of crude fiber treated according to the process of my invention:

EXAMPLE 2

A batch of fine fiber press cake obtained from the wet milling of corn (40 percent dry substance) was divided into 150-gram portions, each of which was slurried in 600 ml. of water. The slurries were adjusted to various pH values, autoclaved for 2 hours at 15 p. s. i., and then filtered immediately through 17½ oz. twill on Buchner funnels. The resulting filtrates were analyzed for total solids, nitrogen content and D. E., and the cakes were dried and weighed. Results are shown in the following table:

*Effect of pH on the destarching of crude fiber press cake*

| Initial pH | 2.4 | 2.8 | 3.0 | 3.2 | 3.6 | 4.0 |
|---|---|---|---|---|---|---|
| Wt. of filter cake, (g.) dry basis | 23.0 | 26.6 | 29.0 | 29.2 | 31.0 | 35.0 |
| Dry Substance in Filtrate: | | | | | | |
| Total (g.) | 37.0 | 34.9 | 32.2 | 31.4 | 26.6 | 24.0 |
| g./100 ml | 6.5 | 6.1 | 5.65 | 5.65 | 5.0 | 4.8 |
| Percent of original dry substance | 62.0 | 58.0 | 53.6 | 52.3 | 44.4 | 40.0 |
| D.E.[1] of filtrate, percent dry basis | 17.6 | 13.3 | 11.0 | 9.0 | 6.6 | 5.4 |
| Protein in filtrate (N×6.25): | | | | | | |
| Percent of dry basis | 10.7 | 8.2 | 7.4 | 5.8 | 4.0 | 4.2 |
| Percent of original dry substance | 6.6 | 4.6 | 4.0 | 3.0 | 1.7 | 1.8 |
| Percent of original protein | 46.0 | 33.3 | 27.6 | 20.6 | 11.5 | 12.6 |
| Nonprotein dry substance (essentially starch) in filtrate: | | | | | | |
| Percent of original dry substance | 55.0 | 53.3 | 49.4 | 49.0 | 42.3 | 38.3 |

[1] Dextrose equivalent.

The starch and apparent protein contents of the original crude fiber were 40.0 and 14.2 percent, respectively. Therefore, it is obvious that solubilization of components other than starch or protein increases as the pH during treatment is decreased. At pH levels between 3.2 and 4.0 substantially all of the starch, but no more than 20 percent of the protein, is solubilized; the higher the pH level within the stated range, the smaller the percentage of original protein solubilized. At pH levels much above 4.0, it has been found that the time required to solubilize the starch and permit its removal from residual fiber and protein, increases impracticably.

The D. E. values of the protein-containing carbohydrate syrups obtained by the process of my invention are ordinarily quite low. In some cases, autoclaving the fiber slurries at higher temperatures for shorter periods or agitating the slurries during autoclaving treatment may result in products with increased D. E. values. Otherwise, the filtrates may be subjected to enzymatic or acid hydrolysis to obtain the desired increase, according to procedures well known in the art. Autoclaving fiber slurries at lower pH levels results in final products with higher D. E. values, but undesirably large amounts of protein may be extracted by such procedures, as already shown.

The following example illustrates the manner in which my invention may be applied to the mixed by-products of the wet milling of grain sorghum:

EXAMPLE 3

A mixture of by-products obtained in the wet milling of grain sorghum was prepared, consisting of coarse fiber, fine fiber and gluten in the proportions of 16.8, 35.3 and 47.9 parts by weight, respectively; this mixture is representative of the proportions in which these materials are produced in the milling process. This mixture was stirred in sufficient water to form a slurry containing 10 percent solids, adjusted to pH 3.0 with hydrochloric acid, and heated by direct steam with continuous agitation to 100° C. The mixture was then autoclaved at 15 p. s. i. for one hour and filtered immediately under vacuum through 17½ oz. twill. A series of extracts prepared in this manner contained an average of 9.5 percent protein and 82.4 percent starch (dry basis), the latter figure being derived from the total D. E., after acid hydrolysis of the aqueous phase, calculated as starch; D. E. of the extracts before hydrolysis averaged 14.6. Recovery of non-protein dry substance in the extracts indicated essentially complete recovery of the starch contained in the original mixture, although analysis of the filter cakes for starch accounted for about 3 percent of the original starch. Similar experiments, wherein the pH level during the autoclaving treatment was varied in intervals between 2.5 and 3.5 showed that recovery of non-protein dry substance in the aqueous phase is essentially independent of pH within this range, but that maximum filtration rate is obtained by carrying out the solubilization at a pH of about 3.0. When solubilization was carried out at pH 4.0, the treated slurry could be filtered only at an impractical rate.

The following examples illustrate the manner in which the process of my invention may be employed to recover starch from gluten and simultaneously enrich the gluten from the standpoint of protein content:

EXAMPLE 4

A batch of corn gluten in slurry form, from which starch had been removed mechanically by conventional means and containing about 67 percent protein, 13 percent starch, 10 percent oil, 5 percent fiber and 5 percent solubles (dry basis), was concentrated to 10 percent dry substance. The pH of the slurry was about 4. One liter of this slurry was autoclaved for one hour at 12 pounds steam pressure and then filtered without reduction in temperature. The filtrate at 750 ml. contained 17.2 grams of dry substance, of which 15 percent was protein. The filter cake was treated again as before, yielding a second filtrate of 7.62 percent, dry substance. The final cake contained only 0.9 percent starch and analyzed 80 percent protein.

EXAMPLE 5

Flash-dried gluten (100 grams as is, analyzing 65 percent apparent protein) was slurried in 300 ml. of water and acidified with hydrochloric acid to pH 3.6. The slurry was placed in a Hormann pressure filter, heated with direct steam for 15 minutes at 10 to 15 lbs. gauge (240–250° F.) and was filtered directly. Filtration was rapid, giving an opalescent filtrate which on cooling had the characteristic of a thin starch paste. The filter cake was reslurried in the initial volume of water, briefly heated at 10 to 15 lbs. pressure and refiltered. The final cake analyzed 10 percent oil, 1 percent carbohydrate, and 77 percent protein, dry basis.

The protein content of syrups prepared by the process of my invention may be somewhat higher than desired for some applications, such as if the product is to be employed as a brewer's syrup. In such cases, protein concentration may be brought to a lower level by blending in the required amount of prime starch converter liquor.

I claim:

1. Process for destarching a cereal wet milling fraction from the group consisting of starch-containing fiber, gluten, and mixtures thereof, comprising heating an aqueous slurry of said starch-containing material at pressures above atmospheric up to about 15 p. s. i. at a pH value within the range of about 3.2 to about 4.0, until a substantial proportion of the starch therein has been solubilized with a minimum amount of degradation of the starch and solubilization of the protein, and separating the destarched fraction from said treated slurry at a temperature not substantially below 100° C.

2. Process according to claim 1, wherein said cereal is corn.

3. Process according to claim 1, wherein said cereal is grain sorghum.

4. Process for producing a protein-containing carbohydrate syrup, comprising heating an aqueous slurry of a cereal wet milling fraction from the group consisting of starch-containing fiber, gluten, and mixtures thereof, at pressures above atmospheric up to about 15 p. s. i. and at a pH value within the range of about 3.2 to about 4.0, for a period of time sufficient to solubilize a substantial proportion of the starch contained in said wet milling fraction with a minimum amount of degradation of the starch and solubilization of the protein, separating the destarched solid phase from the hot liquid phase, and concentrating said liquid.

5. Process for producing a protein-containing carbohydrate syrup, comprising heating an aqueous slurry of a cereal wet milling fraction from the group consisting of starch-containing fiber, gluten, and mixtures thereof, at a pH value within the range of about 3.2 to about 4.0 and a pressure within the range of about 10 p. s. i. to about 15 p. s. i. (240 to 250° F.) for a period of about 15 minutes to about 2 hours, to solubilize substantially all of the starch contained in said fraction with a minimum amount of degradation of the starch and solubilization of the protein, filtering said treated slurry while hot, and concentrating the filtrate.

6. Process according to claim 5, wherein said slurry contains from about 5 to about 10 percent total solids.

7. Process according to claim 5, wherein said cereal is corn.

8. Process according to claim 5, wherein said cereal is grain sorghum.

9. Process for destarching a starch-containing fiber- and gluten-rich fraction, as obtained in the wet milling of a cereal, comprising the steps of heating an aqueous slurry of said fraction at a pH within the range of about 3.2 to about 4 and to a temperature above 100° C. to solubilize a substantial proportion of the starch with a minimum amount of degradation of the starch and solubilization of the protein, and thereafter separating at a temperature not substantially lower than 100° C., a water-dispersed carbohydrate fraction.

10. Process for destarching a starch-containing fiber- and gluten-rich fraction, as obtained in the wet milling of a cereal, comprising heating an aqueous slurry of said fraction at a pH within the range of about 3.2 to about 4 at a temperature above 100° C. until the slurry can be separated by filtration into a water-dispersed carbohydrate fraction which has not been degraded and a water-insoluble gluten-fiber fraction, and thereafter separating said fractions at a temperature not less than about 100° C.

11. Process according to claim 1, wherein said cereal wet milling fraction is gluten.

12. Process according to claim 1, wherein said cereal wet milling fraction is crude fiber.

13. Process according to claim 4, wherein said cereal wet milling fraction is gluten.

14. Process according to claim 4, wherein said cereal wet milling fraction is crude fiber.

15. Process according to claim 5, wherein said cereal wet milling fraction is gluten.

16. Process according to claim 5, wherein said cereal wet milling fraction is crude fiber.

References Cited in the file of this patent

UNITED STATES PATENTS

| Number | Name | Date |
|---|---|---|
| 241,202 | Fell | May 10, 1881 |
| 244,902 | Johnson | July 26, 1881 |
| 250,117 | Weber | Nov. 29, 1881 |
| 1,165,689 | Marsden | Dec. 28, 1915 |
| 2,094,558 | Daly et al. | Sept. 28, 1937 |
| 2,307,491 | Daly et al. | Jan. 5, 1943 |
| 2,307,725 | Daly et al. | Jan. 5, 1943 |